United States Patent
Park et al.

(10) Patent No.: US 6,819,015 B2
(45) Date of Patent: Nov. 16, 2004

(54) STATOR FASTENING STRUCTURE OF RECIPROCATING MOTOR

(75) Inventors: Kyeong Bae Park, Gwangmyoung (KR); Eon Pyo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 09/986,685

(22) Filed: Nov. 9, 2001

(65) Prior Publication Data

US 2002/0113497 A1 Aug. 22, 2002

(30) Foreign Application Priority Data

Feb. 2, 2001 (KR) .......................................... 5126/2001

(51) Int. Cl.[7] ........................ H02K 01/04; H02K 05/00; H02K 35/04
(52) U.S. Cl. ............................. 310/12; 310/13; 310/15
(58) Field of Search ............................ 310/11, 12, 13, 310/14, 15; 417/417

(56) References Cited

U.S. PATENT DOCUMENTS

| | | | | |
|---|---|---|---|---|
| 3,536,941 A | * | 10/1970 | Tourtellotte .................. | 310/27 |
| 3,896,319 A | * | 7/1975 | Chari .......................... | 310/14 |
| 4,220,899 A | * | 9/1980 | von der Heide ............ | 318/135 |
| 4,454,426 A | * | 6/1984 | Benson ....................... | 290/1 R |
| 4,675,563 A | * | 6/1987 | Goldowsky .................. | 310/15 |
| 4,937,481 A | * | 6/1990 | Vitale .......................... | 310/15 |
| 5,434,459 A | * | 7/1995 | Pinkerton .................... | 310/20 |
| 6,077,054 A | * | 6/2000 | Lee et al. ................... | 417/417 |
| 6,127,750 A | * | 10/2000 | Dadd .......................... | 310/13 |
| 6,174,141 B1 | * | 1/2001 | Song et al. ................. | 417/312 |
| 2002/0113497 A1 | * | 8/2002 | Park et al. .................. | 310/12 |

FOREIGN PATENT DOCUMENTS

| | | | |
|---|---|---|---|
| JP | 54098908 A | * | 8/1979 |
| JP | 06-284670 A | | 10/1994 |
| JP | 10-080121 A | | 3/1998 |
| JP | 2001-116100 A | | 2/2000 |
| JP | 2000-236653 A | | 8/2000 |

* cited by examiner

*Primary Examiner*—Thanh Lam
*Assistant Examiner*—David W. Scheuermann
(74) *Attorney, Agent, or Firm*—Birch, Stewart, Kolasch & Birch, LLP

(57) ABSTRACT

A stator fastening structure of a reciprocating motor is provided. In the stator fastening structure of a reciprocating motor, a frame which includes an outer core fixing member, to which an outer core is fixed, and an inner core fixing member, to which an inner core is fixed, wherein the outer core fixing member of the frame and the inner core fixing member of the frame are formed of different material from each other. It is possible to prevent leakage of flux to a frame, in which the reciprocating motor is loaded, to thus minimize the loss of the flux and to reduce material cost and production cost.

3 Claims, 4 Drawing Sheets

STATOR FASTENING STRUCTURE OF RECIPROCATING MOTOR

BACKGROUND OF THE INVENTION

1. Field of the Invention

The present invention relates to a stator fastening structure of a reciprocating motor, and more particularly, to a stator fastening structure of a reciprocating motor, which is capable of preventing the leakage of the flux formed in a stator of a reciprocating motor and of reducing the manufacturing cost of a frame, in which the stator is loaded.

2. Description of the Background Art

In general, a reciprocating motor is formed by making the flux of a common three-dimensional motor plane. A plane moving part linearly moves on a plane according to a change in the flux formed on a plane fixed part. The reciprocating motor according to the present invention can be in a linear reciprocating motion by attaching a plurality of plane magnets to the cylindrical circumference of a moving magnet by applying the above principle.

FIGS. 1 and 2 respectively show an example of the reciprocating motor. As shown in FIGS. 1 and 2, the reciprocating motor includes a stator S consisting of a cylindrical outer core 10 and a cylindrical inner core 20, which is inserted into the outer core 10 to be separated from the outer core 10 by a predetermined distance, a winding coil 30 combined with the outer core 10 or the inner core 20 inside the outer core 10 or the inner core 20, and a moving magnet 40, which includes permanent magnets 41 and is inserted between the outer core 10 and the inner core 20 to be movable. In FIGS. 1 and 2, the winding coil is combined with the outer core.

The outer core 10 is a cylindrical stacked substance formed by radially stacking lamination sheets 11, which are predetermined shaped thin plates.

When the winding coil 30 is combined with the outer core 10, a cylindrical bobbin 50, around which coil is wound in multiple layers, is used as the winding coil 30 in order to secure electrical insulation and the convenience of fabrication.

The inner core 20 is a stacked substance formed by radially stacking a plurality of lamination sheets 21 formed of predetermined shaped thin plates to be cylindrical.

The moving magnet 40 is formed by combining the plurality of permanent magnets 41 with a cylindrical permanent magnet holder 42 such that the permanent magnets 41 are separated from each other by the same distance.

In the above-mentioned reciprocating motor, when current flows through the winding coil 30, flux is formed around the winding coil 30 due to the current that flows through the winding coil 30. The flux forms a closed loop along the outer core 10 and the inner core 20 that form the stator S.

Because the permanent magnets 41 receive force in an axial direction due to the mutual action between the flux formed in the outer core 10 and the inner core 20 and the flux formed by the permanent magnets 41, the moving magnet 40 is in a linear motion in the axial direction between the outer core 10 and the inner core 20. When the direction of the current applied to the winding coil 30 is alternately changed, the moving magnet 40 is in a linear reciprocating motion.

When the reciprocating motor is loaded in a system and the output of the reciprocating motor is used as a driving source, the reciprocating motor is loaded in a frame that forms the system.

FIG. 3 shows an example of a conventional structure, in which the reciprocating motor is combined with the frame.

As shown in FIG. 3, the frame 60 includes an outer core-loading portion 61 having a predetermined shaped area and a cylindrical inner core-loading portion 62 formed in the middle of the outer core-loading portion 61 to have a predetermined height.

The outer core 10 that forms the stator S is loaded in the outer core-loading portion 61 of the frame 60. The inner core 20 is inserted into the outer core 10 to be separated from the outer core 10 by a predetermined distance and is inserted into and fixed to the inner core-loading portion 62. The stator S is inserted between the outer core 10 and the inner core 20.

Because the outer core 10 and the inner core 20 of the stator loaded in the frame 60 are separated from each other. The frame 60 must be formed of a non-magnetic material in order to prevent the leakage of the flux formed using the outer core 10 and the inner core 20 that form the stator S as paths.

The frame 60 is commonly formed of stainless steel or aluminum, which is the non-magnetic material. When the frame 60 is formed of stainless steel, the material cost is expensive. When the frame 60 is formed of aluminum, the frame 60 is manufactured by aluminum die-casting. In this case, the processing expenses are high.

SUMMARY OF THE INVENTION

Therefore, an object of the present invention is to provide a stator fastening structure of a reciprocating motor, which is capable of preventing the leakage of the flux formed in a stator of a reciprocating motor and of reducing the manufacturing cost of a frame, in which the stator is loaded.

To achieve these and other advantages and in accordance with the purpose of the present invention, as embodied and broadly described herein, there is provided a stator fastening structure of a reciprocating motor, in which a frame which includes an outer core fixing member, to which an outer core is fixed, and an inner core fixing member, to which an inner core is fixed, wherein the outer core fixing member of the frame and the inner core fixing member of the frame are formed of different material from each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A stator fastening structure of a reciprocating motor according to the present invention will now be described in detail with reference to an embodiment shown in the accompanying drawings.

Figure 1:
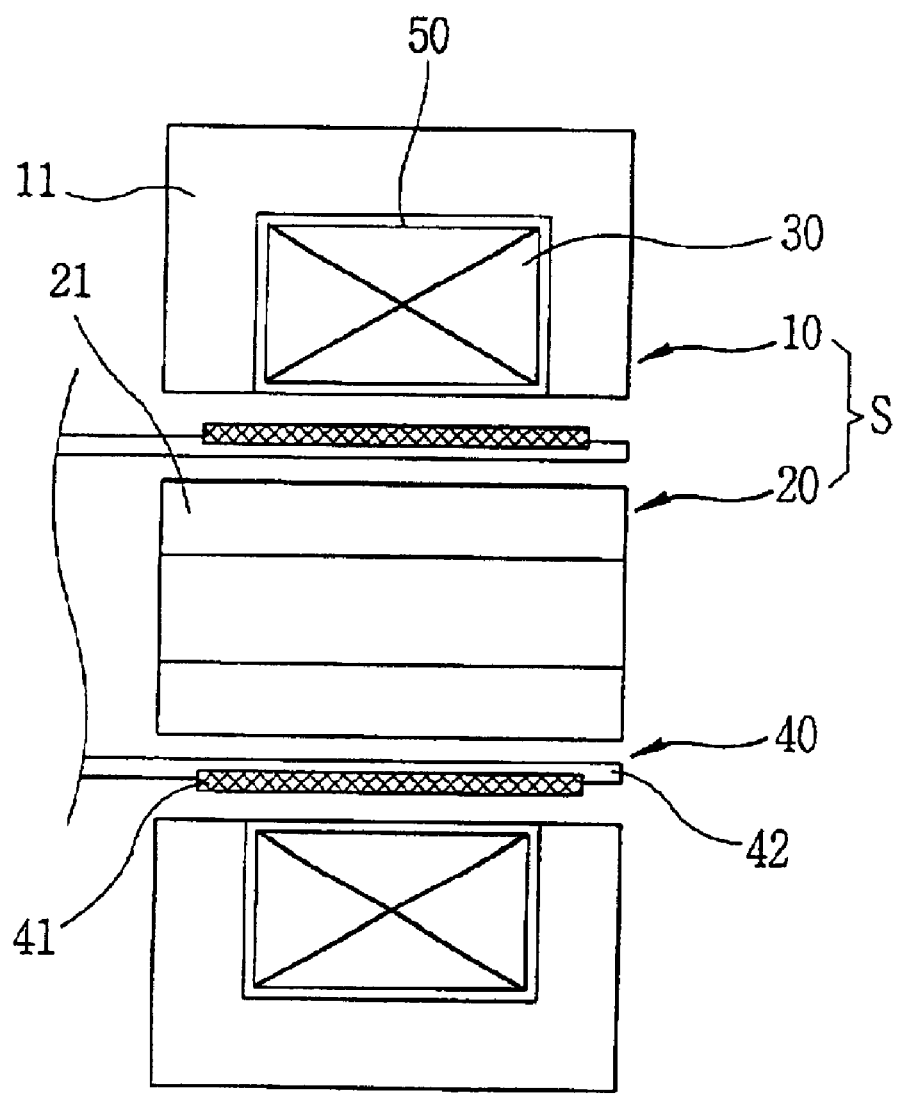
FIG. 1 is a sectional view showing an example of a conventional reciprocating motor.
Figure 2:
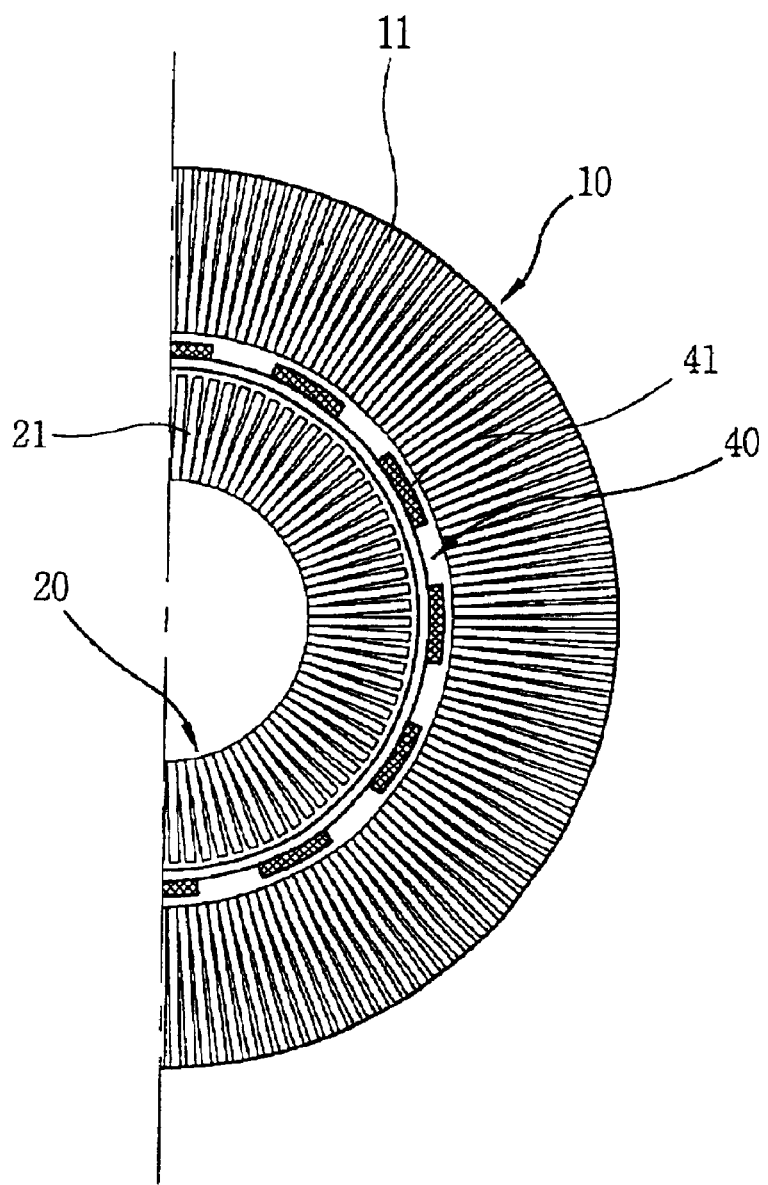
FIG. 2 is a side view showing the example of the conventional reciprocating motor.
Figure 3:
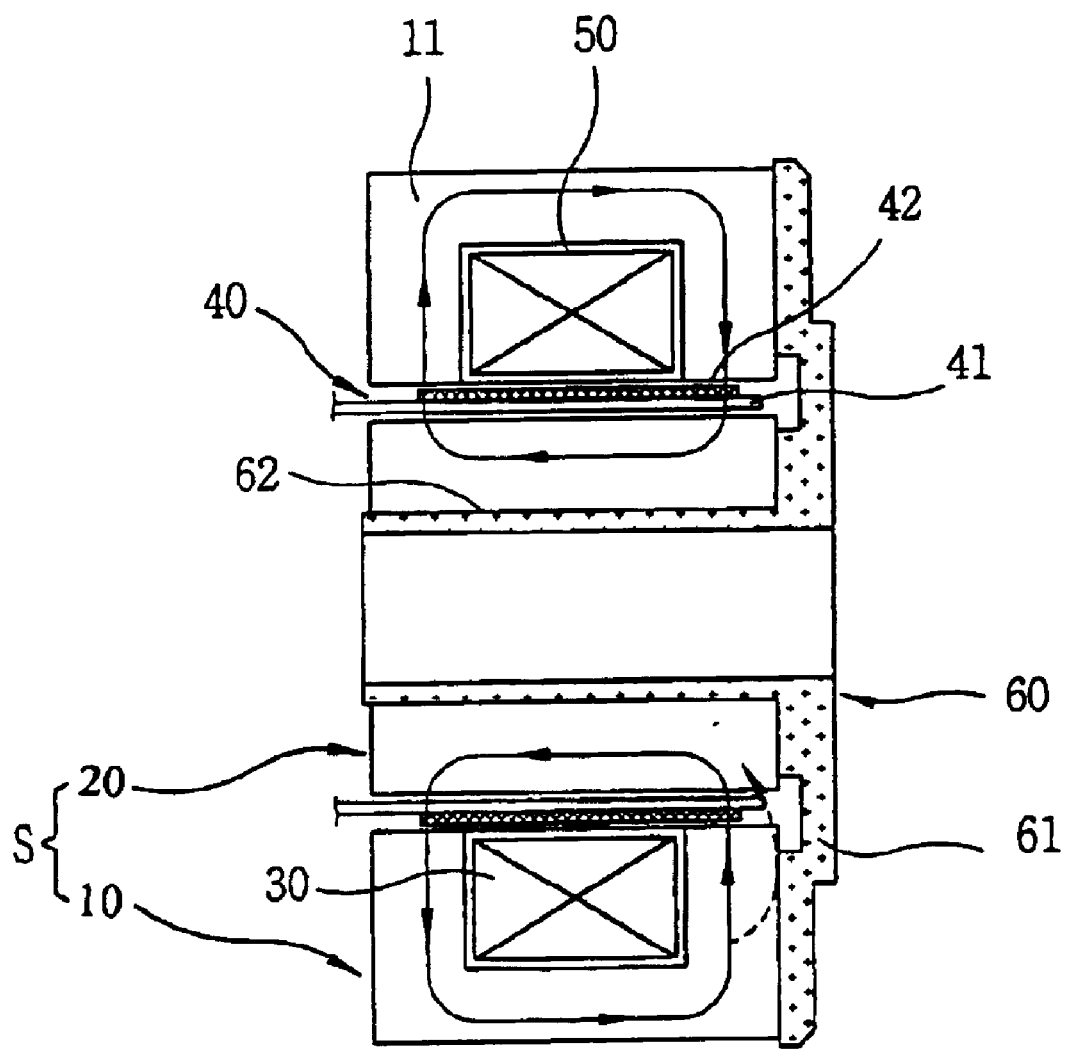
FIG. 3 is a sectional view showing that a stator fastening structure of a conventional reciprocating motor.
Figure 4:
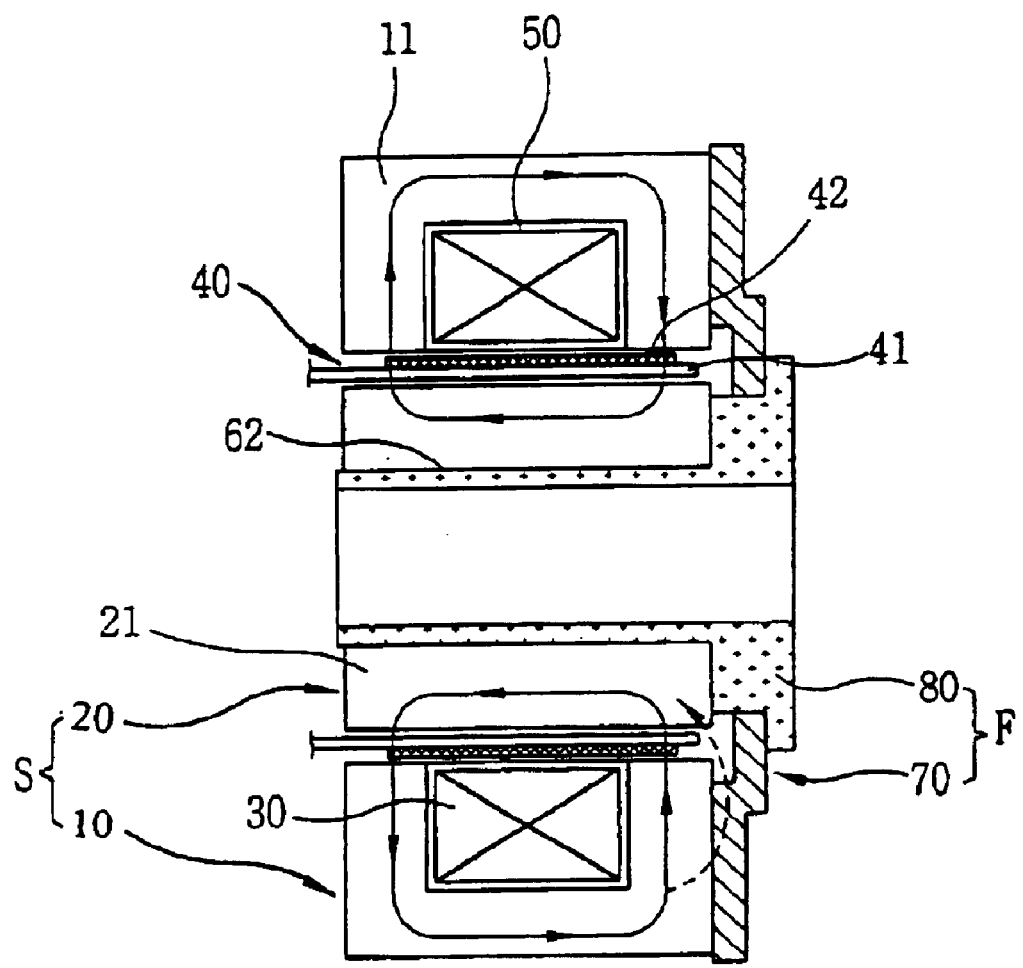
FIG. 4 shows a stator fastening structure of a reciprocating motor according to the present invention.

FIG. 4 shows an example of a stator fastening structure of a reciprocating motor according to the present invention. The reciprocating motor includes a stator S consisting of a cylindrical outer core 10 and a cylindrical inner core 20, which is inserted into the outer core 10 to be separated from the outer core 10 by a predetermined distance, a winding coil 30 combined with the outer core 10 or the inner core 20 inside the outer core 10 or the inner core 20, and a moving magnet 40, which includes permanent magnets 41 and is inserted between the outer core 10 and the inner core 20 to be movable. In FIG. 4, the winding coil is combined with the outer core.

A frame F, in which the reciprocating motor is loaded, is formed by combining an outer core loading portion 70 having a predetermined shaped area and a cylindrical inner core loading portion 80 formed in the middle of the outer core loading portion 70 to be vertical to the outer core loading portion 70. Either the outer core-loading portion 70 or the inner core-loading portion 80 is formed of a non-magnetic material. The other is formed of a magnetic material.

That is, the outer core-loading portion 70 of the frame F is formed of the magnetic material. The inner core-loading portion 80 is formed of the non-magnetic material.

In a modification of the frame F, the outer core-loading portion 70 is formed of the non-magnetic material and the inner core-loading portion 80 is formed of the magnetic material.

The outer core 10 is a stacked substance formed by radially stacking a plurality of lamination sheets 11 formed of predetermined shaped thin plates to be cylindrical.

When the winding coil 30 is combined with the outer core 10, a cylindrical bobbin 50, around which coil is wound in multiple layers, is used as the winding coil 30 in order to secure electrical insulation and the convenience of fabrication. The outer core 10 is formed by radially stacking the plurality of lamination sheets 11 in the bobbin 50 to be cylindrical.

The side of the outer core 10 is fixed to and combined with the outer core-loading portion 70 of the frame F.

The inner core 20 is a stacked substance formed by radially stacking a plurality of lamination sheets 21 formed of predetermined shaped thin plates to be cylindrical.

The inner core 20 is inserted into the outer core 10 to be separated from the outer core by a predetermined distance and is inserted into and fixed to the inner core-loading portion 80.

The moving magnet 40 is formed by combining the plurality of permanent magnets 41 with a cylindrical permanent magnet holder 42 such that the permanent magnets 41 are separated from each other by the same distance. The moving magnet 40 is inserted between the outer core 10 and the inner core 20

The effect of a stator fastening structure of the reciprocating motor according to the present invention will now be described.

When power is applied and current flows through the winding coil 30, the flux is formed around the winding coil 30 due to the current that flows through the winding coil 30. The flux forms a closed loop along the outer core 10 and the inner core 20 that form the stator S.

The permanent magnets 41 receive force in an axial direction due to the mutual action between the flux formed in the outer core 10 and the inner core 20 and the flux formed by the permanent magnets 41. Accordingly, the moving magnet 40 is in a linear motion in the axial direction between the outer core and the inner core 20. When the direction of the current applied to the winding coil 30 is alternately changed, the moving magnet 40 is in a linear reciprocating motion.

Because either the outer core loading portion 70 of the frame F or the inner core loading portion 80 is formed of the non-magnetic material and the other is formed of the magnetic material in the above processes, the leakage of the flux formed in the stator S is prevented.

When the outer core-loading portion 70 of the frame F is formed of steel and the inner core-loading portion 80 is formed of aluminum, the flux that flows through the outer core 10 of the stator also flows through the outer core loading portion 70. When the flux flows to the inner core 20, it is possible to prevent leakage of the flux since the inner core-loading portion 80, in which the inner core 20 is loaded, is formed of the non-magnetic material.

According to the present invention, because the frame F, in which the reciprocating motor is loaded, is formed of the non-magnetic material and the magnetic material, the use of the non-magnetic material, which is expensive and whose production cost is also expensive, is reduced.

As mentioned above, according to the stator fastening structure of the reciprocating motor according to the present invention, it is possible to prevent leakage of the flux to the frame, in which the reciprocating motor is loaded, to thus minimize the loss of the flux. Accordingly, it is possible to enlarge the output of the motor. Also, it is possible to reduce material cost and production cost, to thus improve the competitiveness of products.

What is claimed is:

1. A stator fastening structure of a reciprocating motor, comprising:

a frame extending across an axial end of said motor which includes an outer core fixing member and an inner core fixing member;

said outer core fixing member being fixed to and supporting an outer core of said stator at an axial end of said outer core;

said inner core fixing member being fixed to and supporting an inner core of said stator at an axial end of said inner core corresponding to said axial end of said outer core;

said outer core fixing member and said inner core fixing member being joined near said axial ends of said inner and outer cores;

the outer core fixing member of the frame and the inner core fixing member of the frame being formed of different material from each other, with one being magnetic and another non-magnetic.

2. The stator fastening structure of claim 1, wherein the outer core fixing member of the frame is formed of a magnetic material and the inner core fixing member is formed of a non-magnetic material.

3. The stator fastening structure of claim 1, wherein the outer core fixing member of the frame is formed of a non-magnetic material and the inner core fixing member is formed of a magnetic material.

* * * * *